United States Patent [19]

Albinski

[11] Patent Number: 5,956,820
[45] Date of Patent: Sep. 28, 1999

[54] FASTENING DEVICE FOR AN ELECTRONIC MODULE

[75] Inventor: Christian Albinski, Seelze, Germany

[73] Assignee: Continental Aktiengesellschaft, Hannover, Germany

[21] Appl. No.: 08/883,629

[22] Filed: Jun. 26, 1997

[30] Foreign Application Priority Data

Jul. 1, 1996 [DE] Germany ............................ 196 26 145

[51] Int. Cl.$^6$ .................................................. B60C 23/00
[52] U.S. Cl. ............................................. 24/455; 340/442
[58] Field of Search ............................. 24/455, 570, 571, 24/3.1, 3.12; 340/442, 443, 447; 152/427

[56] References Cited

U.S. PATENT DOCUMENTS

| | | | |
|---|---|---|---|
| 3,533,063 | 10/1970 | Garcia | 340/447 |
| 4,117,452 | 9/1978 | Snyder et al. | 340/443 |
| 4,196,414 | 4/1980 | Muller . | |
| 4,554,527 | 11/1985 | Muller | 340/443 |
| 5,119,066 | 6/1992 | Ballyns | 340/442 |
| 5,452,608 | 9/1995 | Green | 73/146.8 |
| 5,581,023 | 12/1996 | Handfield et al. | 73/146.5 |

*Primary Examiner*—James R. Brittain
*Assistant Examiner*—Robert J. Sandy
*Attorney, Agent, or Firm*—Greenblum Bernstein, P.L.C.

[57] ABSTRACT

Device and method for attaching the electronic module to a vehicle tire rim. The device may include a spring element having a fastening wing and a clamping wing. A valve body may be coupled to the fastening wing and the clamping wing may be coupled to the electronic module to clamp the electronic module against the vehicle tire rim. The method may include coupling a spring element to a drop base of the vehicle wheel rim and clamping the electronic module between the spring element and the drop base.

39 Claims, 4 Drawing Sheets

FASTENING DEVICE FOR AN ELECTRONIC MODULE

CROSS-REFERENCE TO RELATED APPLICATION

The present application claims priority under 35 U.S.C. §119 of German Patent Application No. 196 26 145.7, filed on Jul. 1, 1997.

BACKGROUND OF THE INVENTION

1. Field of the Invention

The present invention relates to a device for detachably fastening an electronic module to a vehicle wheel having a pneumatic tire with a spring element.

2. Discussion of Background Information

To transmit measurement data related to a vehicle wheel, e.g., air pressure, temperature, etc., from the wheels to a central evaluation device that is a part of the vehicle, it is necessary to affix an electronic module inside an air chamber of the vehicle wheel. The placement of the module should be made so that neither extremely intense centrifugal forces that occur while traveling at high speeds nor installation procedures required when changing a tire can cause damage.

The manner of attaching modules in the prior art, e.g., a rigid screw attachment of the module to a valve body or a screw connection of the module to the valve through a ball fitting, do not sufficiently fulfill the above-noted requirements.

Strap retainers that can be affixed in a drop base of a rim are known for fastening electronic components. However, due to different heat expansion coefficients of the rim and strap retainer, elastic spring elements have to be interposed between the strap retainer and the rim for compensation. Although it can be theoretically assumed that the strength of the module seat can be controlled by a choice of initial force or stress to be exerted, the elastic spring elements of this type do not completely eliminate adverse effects on strength.

Further, in dimensioning the strap retainer, it is necessary to consider the format and size of the rim to which the module is to be attached.

Additional disadvantages associated with these strap retainers arise from an unfavorable polygon of forces, i.e., due to introduction of centrifugal force and high tensile load in the strap retainer. Also, due to a conical shape in the drop base bottom of certain rim types, a uniform introduction of force into the strap retainer is complicated.

SUMMARY OF THE INVENTION

The present invention may include providing a universal fastening device for integrating an electronic module into the system tire.

In a device for detachably fastening an electronic module to the rim of a vehicle wheel having a pneumatic tire, the present invention may include a spring element. The electronic module may be clamped between a free end (or clamping wing) of the spring element and the rim of the vehicle wheel.

A spring element of the type discussed above utilizes only a small amount of space and may be universally affixed to rims of various types and sizes. Due to the compact structural dimensions of the spring element, an unbalancing mass associated with the spring element is so low as to be almost negligible. In principle, the required total mass may be considerably reduced in comparison to other known systems. Further, due to its simple design, the spring element can be inexpensively produced on a large scale.

According to a preferred embodiment, the spring element may be affixed to an end of a valve body oriented toward an inner chamber of the tire. In this manner, for example, a particular weld or a screw for fastening the spring element to the valve body may be eliminated.

In order to ensure a secure seating of the electronic module, a contact face of the spring element may be profiled so that a profile of the spring element may represent an imprint of a correspondingly profiled electronic module. In this way, a positive fit for absorbing forces in a y-z plane, i.e., transverse to a circumference of the wheel and radial to the wheel, may be ensured. This provides not only a particularly fixed seating, but also a precisely, predetermined position for the electronic module.

a stop ring that may be affixed between the rim and the spring element may compensate for pressures on the seal. At the same time, the seal may be prevented from being crushed during installation and the correct position of the module may be ensured.

The spring may preferably include a progressive or two-stage characteristic curve, that, in accordance with the present invention, may be realized by splitting the free spring end. That is, the outer part of the free spring end may produce a required prestress force and the inner part, which may have a considerably higher rigidity than the outer part, may function as a spring path limiting device.

The present invention may also be directed to an assembly including an electronic module for attaching the electronic module to a vehicle tire rim. The assembly may include a spring element having a fastening wing and a clamping wing, and a valve body coupled to the fastening wing. The clamping wing may be coupled to the electronic module to clamp the electronic module against the vehicle tire rim.

According to another feature of the present invention, the valve body may extend through the vehicle tire rim and may include an end positioned within an inner chamber of a tire coupled to the fastening wing. Further, the assembly may include a seal positioned around the valve body and between the fastening wing and the vehicle tire rim. Still further, the assembly may include a stop ring positioned around the seal and between the fastening wing and the vehicle tire rim.

According to still another feature of the present invention, the assembly may include a seal positioned between the fastening wing and the vehicle tire rim.

According to still another feature of the present invention, the assembly may include a stop ring positioned around the valve body and between the fastening wing and the vehicle tire rim.

According to a further feature of the present invention, the clamping wing may include a profiled portion extending inward toward the fastening wing. Further, the profiled portion may exert a prestressing force on the electronic module and the clamping wing may also include a spring path limiter having a rigidity greater than the profiled portion.

According to another feature of the present invention, the electronic module may include a profiled portion to receive the profiled portion of the clamping wing.

According to a still further feature of the present invention, the electronic module may include a first and second contact point that contact a corresponding first and second contact point on the vehicle tire rim. Further, the electronic module may include a center of gravity positioned between a line formed between the first and second contact point and the vehicle tire rim.

According to another feature of the present invention, the fastening wing may be screwably coupled to the valve body.

According to still another feature of the present invention, the electronic module may be attached to a drop base of the vehicle tire rim.

According to yet another feature of the present invention, the electronic module may be movable around an axis parallel to a line tangent to the vehicle rim.

The present invention may also be directed to a method for attaching an electronic module to a vehicle wheel rim. The method may include coupling a spring element to a drop base of the vehicle wheel rim and clamping the electronic module between the spring element and the drop base.

According to a further feature of the present invention, the method may include positioning a first bottom portion of the electronic module into a first seat position, positioning a second bottom portion of the electronic module into a second seat position, and positioning a center of gravity of the electronic module between a line formed between the first and second seat position and the drop base.

According to another feature of the present invention, the coupling of the spring element to the drop base may include locating a valve body to extend through the drop base and attaching a first leg of the spring element to the valve body. Further, the method may include sealing the attachment of the first leg and the valve body and inserting a spacer device between the first leg and the valve body to protect the sealing attachement.

According to still another feature of the present invention, the clamping of the electronic module may include exerting a substantially constant force on a top portion of the electronic module toward the drop base. The substantially constant force may be greater than a centrifugal force exerted by rotation of the vehicle wheel rim.

According to a still further feature of the present invention, the clamping of the electronic module may include exerting a substantially constant first force on a top portion of the electronic module toward the drop base and exerting a substantially constant second force, greater than the substantially constant first force, on the top portion of the electronic module toward the drop base when a centrifugal force is greater than the substantially constant first force.

According to yet another feature of the present invention, the clamping of the electronic module may include contacting a top of the electronic module with a leg of the spring element to exert a clamping force. Further, the clamping of the electronic module may also include adjusting the clamping force in accordance with a length of the leg of the spring element.

The present invention may be directed to a device for detachably fastening an electronic module to a rim of a vehicle wheel having a pneumatic tire. The device may include a spring element including a free end so that the electronic module may be clamped between the free end and the rim.

According to another feature of the present invention, the spring element may be affixed to an end of a valve body oriented toward an inner chamber of the pneumatic tire.

According to another feature of the present invention, a contact face of the free end may have a profiled portion. The profiled portion may correspond with a substantially equivalent profiled portion of the electronic module.

According to still another feature of the present invention, the device may also include a seal and a stop ring. The stop ring may compensate pressures exerted on the seal.

According to a further feature of the present invention, the free end may include a longitudinal split forming an outer part and an inner part. The inner part may have a greater rigidity than the outer part. The outer part may produce a prestress force to be exerted on the electronic module to position the electronic module in a drop base and may absorb at least a part of a centrifugal force or a reaction force to be exerted on the electronic module. The inner part may be coupled with a support face of the electronic module and may form a spring path limiting device of the outer part when the outer part cannot absorb an intense centrifugal force.

According to a still further feature of the present invention, the device may be used in combination with the electronic module. The electronic module may include an approximately triangular cross-section including a top and two legs. The top may include an arched surface and the two legs may have different leg lengths. The electronic module further including a center of gravity located between a connecting line between seating points of the electronic module and the vehicle wheel rim.

Other exemplary embodiments and advantages of the present invention may be ascertained by reviewing the present disclosure and the accompanying drawing figures.

BRIEF DESCRIPTION OF THE DRAWINGS

The present invention may be further described in the detailed description which follows, in reference to the noted plurality of drawings by way of non-limiting examples of preferred embodiments of the present invention, in which like reference numerals represent similar parts throughout the several views of the drawings, and wherein:

FIG. 1b illustrates a schematic representation of a top view of the spring element depicted in FIG. 1a;

FIG. 2b illustrates a schematic representation of a top view of the alternative arrangement depicted in FIG. 2a;

FIG. 3b illustrates a schematic representation of a top view of the second alternative arrangement depicted in FIG. 3a.

DETAILED DESCRIPTION OF THE PREFERRED EMBODIMENTS

Figure 1A:
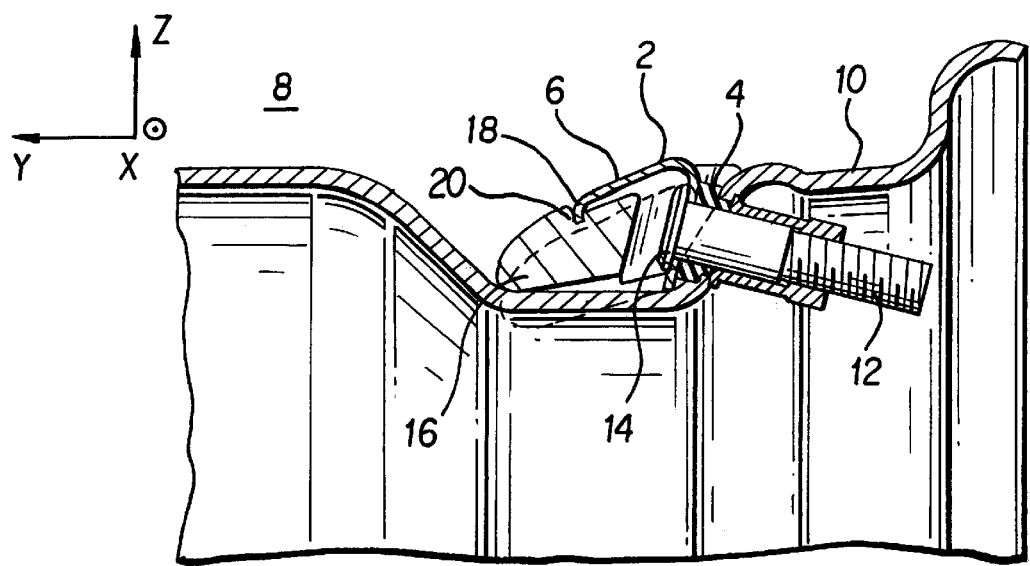
FIG. 1a illustrates a schematic representation of a side view of a spring element according to the present invention.

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawing figures making apparent to those skilled in the art how the invention may be embodied in practice.

Figure 1B:
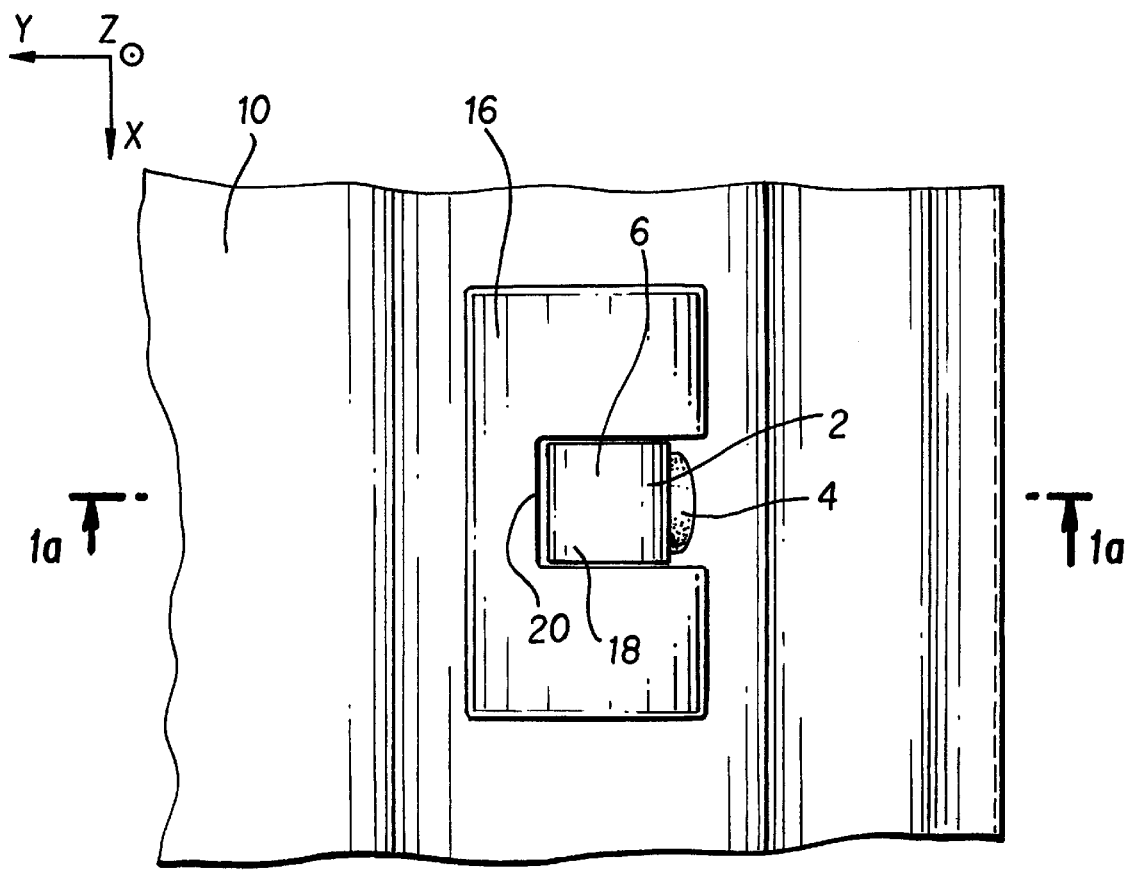

FIGS. 1a and 1b illustrate side and top views, respectively, of an exemplary embodiment of the present invention. a spring element 2, which may be substantially "V" shaped, may include a fastening wing and a clamping wing (or free end) 6. A seal 4 may be coupled to the fastening wing and the fastening wing may be fastened to an end 14 of a valve body 12 that is oriented toward an inner chamber 8 of the tire. Valve 12 may be affixed to, and extend through, a vehicle wheel rim 10 of the vehicle tire. Thus, seal 4 may be positioned between the fastening wing and the vehicle rim 10.

Clamping wing 6 and a wall of the vehicle wheel rim 10 may form a retaining claw in which to clamp the electronic module 16 to be fastened to the vehicle tire.

A housing surface of electronic module 16 may include a profiled portion 20 to facilitate fastening electronic module 16 to the tire. An inside portion of clamping wing 6 may include a profiled portion 18 which is profiled to extend inwardly toward the fastening wing and to correspond with profiled portion 20 of electronic module 16.

Figure 2A:
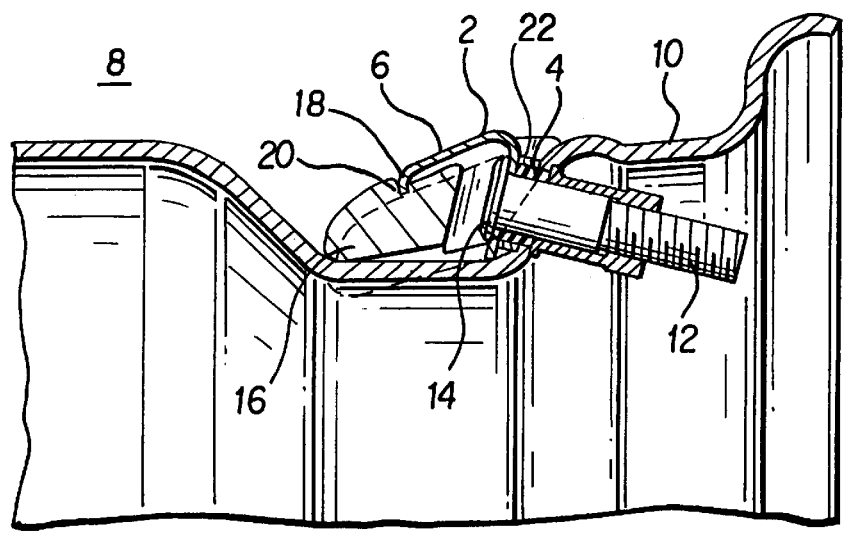
FIG. 2a illustrates a schematic representation of a side view of an alternative arrangement for the spring element according to the present invention.
Figure 2B:
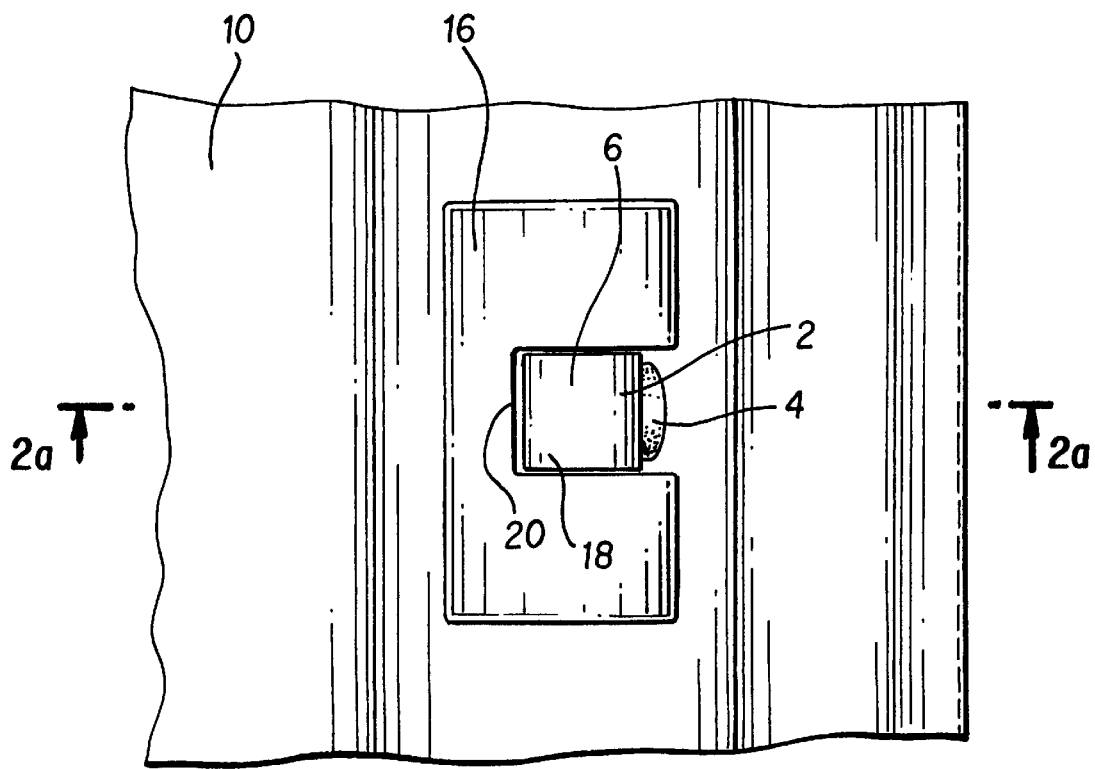

FIGS. 2a and 2b illustrate side and top views, respectively, of an alternative embodiment of the present invention. In particular, this alternative embodiment differs from the exemplary embodiment depicted in FIG. 1a and 1b in that a stop or spacer ring 22 may be utilized to compensate for pressures exerted in seal 4. Thus, stop or spacer ring 22 may prevent seal 4 from being crushed during installation and may ensuring correct position of electronic module 16 with respect to the valve and rim. Further, stop or spacer ring 22 may be formed of any material which would provide the desired compensation. In this regard, it is noted that, in accordance with the present invention, the position of electronic module 16 may change with changes in the spacing between spring element 2 and a drop base flank of vehicle wheel rim 10.

Figure 3A:
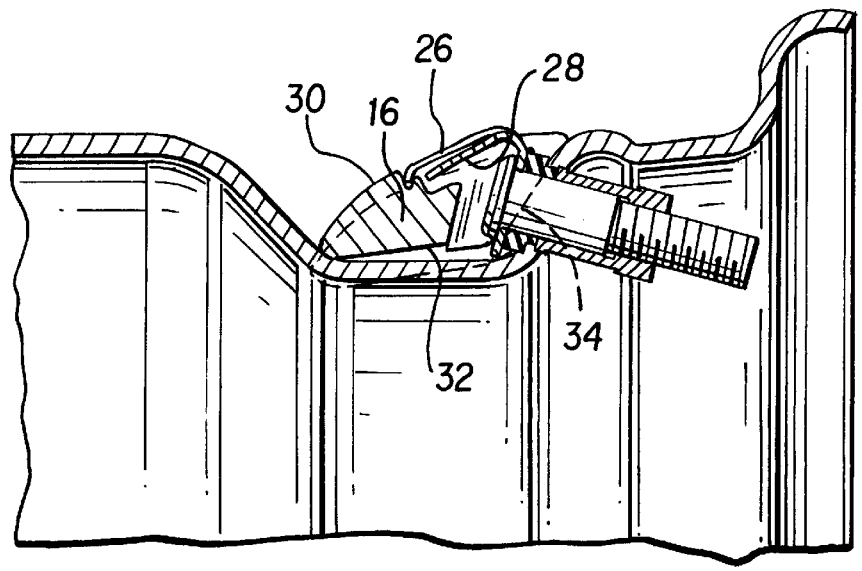
FIG. 3a illustrates a schematic representation of a side view of a second alternative arrangement for the spring element according to the present invention.
Figure 3B:
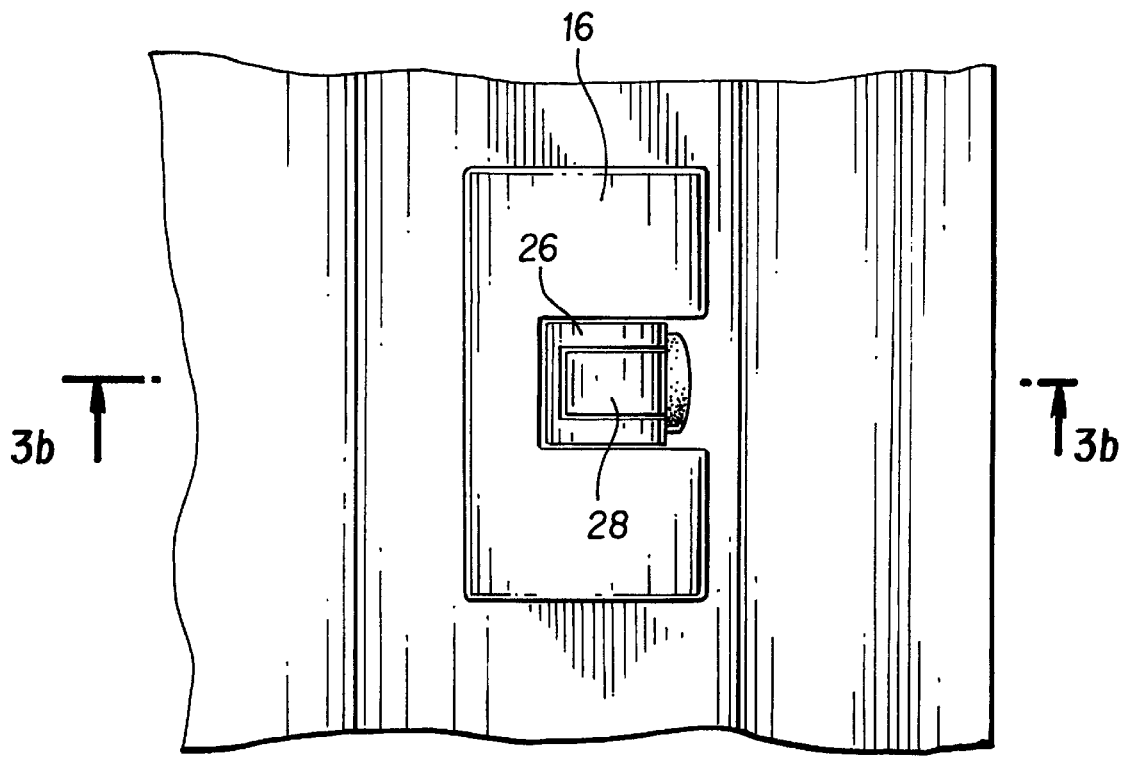

FIGS. 3a and 3b illustrate side and top views, respectively, of a second alternative embodiment of the present invention. In particular, FIGS. 3a and 3b show a two-stage embodiment of spring element 2.

The two-stage nature of this alternative embodiment may be achieved by splitting or dividing free end 6 of spring element 2. Thus, free end 6 may be split to include an outer part 26 that may be utilized to produce a prestress force, and an inner part 28 that may have a considerably higher rigidity than outer part 26. Outer part 26 may position electronic module 16 in the drop base and may absorb part of the centrifugal forces exerted on electronic module 16 by rotation of the wheel and/or its reaction forces. Inner part 28 may have its own support face on electronic module 16. Further, inner part 28, which may be bent inwardly at a greater angle than outer part 26, may function as a spring path limiting device of outer part 26 during the exertion of intense centrifugal forces that cannot be absorbed by outer part 26.

Electronic module 16, which may be matched to fastening spring element 2 in form and size, may include an approximately triangular cross-section. a top 30 of electronic module 16 may include an slightly upwardly arched surface, i.e., away from vehicle wheel rim 10, that produces a sufficiently large volume. An underside of electronic module 16 may include two different legs 32 and 34, which may have different leg lengths. In accordance with this arrangement, a low center of gravity S may be produced beneath a connecting line of module support points, i.e., points at which electronic module 16 contacts vehicle wheel rim 10. The recess located in top 30 may correspond to the size of free end 6 to accommodate inner part 28 and outer part 26 and to produce a substantially precision-fitting hold.

Figure 4:
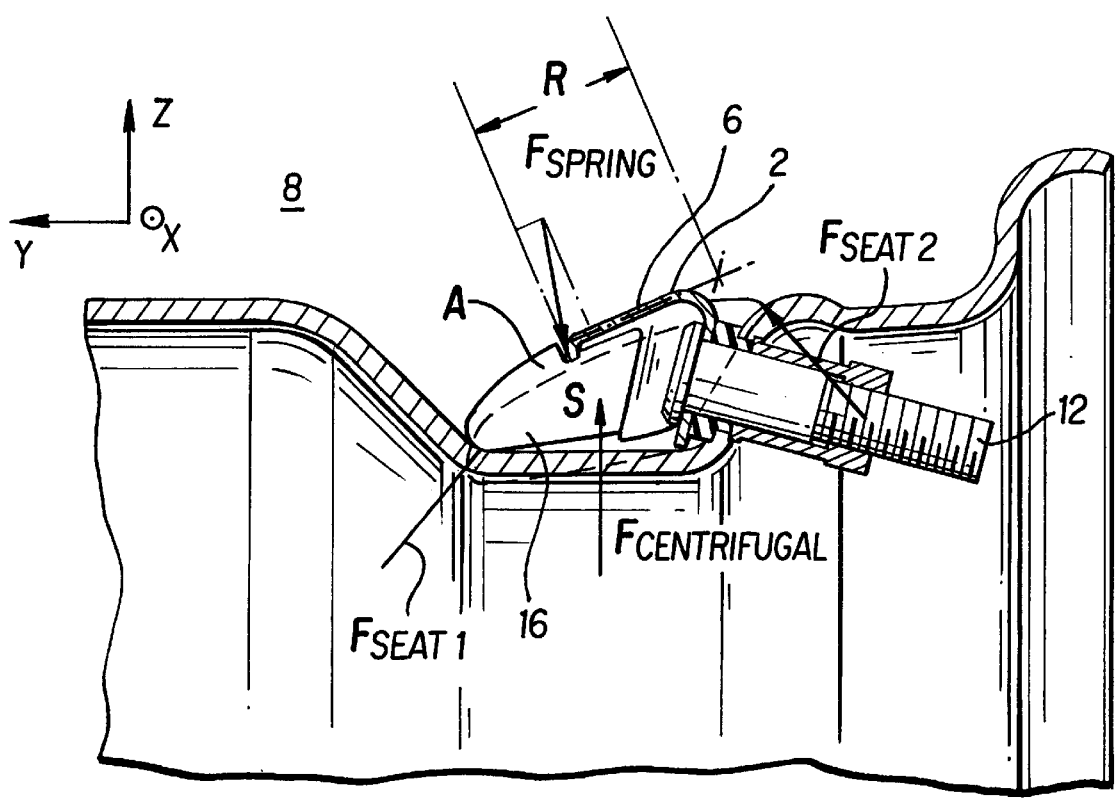
FIG. 4 illustrates the operation and corresponding forces associated with the seating of the electronic module with the spring element of the present invention.

The assembly and function of the present invention may be best understood with reference to FIG. 4. The retaining wing of spring element 2 may be provided with a bore to enable the retaining wing to be affixed or coupled to valve 12, e.g., by a screw connection.

Free spring end 6 may be formed so that electronic module 16 may rotate substantially freely around the x axis relative to spring element 2 (or rotational axis a). Further, free spring end 6 may absorb forces coming from the y-z plane, e.g., by positive fit.

Due to the elasticity of spring element 2 and as a function of the forces being exerted, the position of rotational axis a may move approximately on a circular path with radius R. It should be noted that, depending on the geometry of the drop base and the embodiment of the bore for fastening the valve, radius R may have a significant influence on the position of electronic module 16.

The center of gravity S of electronic module 16 may be preferably located in the y direction between rotational axis a and end of the valve 12 that is oriented toward inner chamber 8 of the tire so as to prevent "in transit sliding" of electronic module 16.

With this particular location of center of gravity S, the various forces that may be exerted during rotation of the wheel are shown. In particular, as the angular frequency of the wheel increases, centrifugal force $F_{centrifugal}$ also increases. Further, as a reaction, spring force $F_{spring}$ and seating force $F_{seat1}$ may increase, while seating force $F_{seat2}$ may decrease.

As a result of the above discussion, when the electronic module mass and the maximal angular frequency are known, movement of electronic module 16 may be prevented or controlled through the design of spring element 2.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

| | Reference Numeral List |
|---|---|
| 2 | Spring element |
| 4 | Seal |
| 6 | Clamping wing (free end) of the spring element |
| 8 | Inner tire chamber of the rim |
| 10 | Vehicle wheel rim |
| 12 | Valve body |
| 14 | End of the valve body oriented toward the inner tire chamber |
| 16 | Electronic module |
| 18 | Profiling on the clamping wing (free end) of the spring element |
| 20 | Profiling (in the housing) of the electronic module |
| 22 | Stop ring (spacer ring) |
| 26 | Outer part of the spring end |
| 28 | Inner part of the spring end |
| 30 | Top of the electronic module |
| 32, 34 | Legs of the underside of the electronic module |

What is claimed is:

1. An assembly including an electronic module for attaching the electronic module to a vehicle tire rim, comprising:

a spring element comprising a fastening wing and a clamping wing;

a valve body coupled to the fastening wing; and the clamping wing coupled to the electronic module to clamp the electronic module against the vehicle tire rim.

2. The assembly according to claim 1, the valve body extending through the vehicle tire rim and including an end positioned within an inner chamber of a tire coupled to the fastening wing.

3. The assembly according to claim 2, further comprising a seal positioned around the valve body and between the fastening wing and the vehicle tire rim.

4. The assembly according to claim 3, further comprising a stop ring positioned around the seal and between the fastening wing and the vehicle tire rim.

5. The assembly according to claim 1, further comprising a seal positioned between the fastening wing and the vehicle tire rim.

6. The assembly according to claim 1, further comprising a stop ring positioned around the valve body and between the fastening wing and the vehicle tire rim.

7. The assembly according to claim 1, the clamping wing comprising a profiled portion extending inward toward the fastening wing.

8. The assembly according to claim 7, the profiled portion exerting a prestressing force on the electronic module; and the clamping wing further comprising a spring path limiter having a rigidity greater than the profiled portion.

9. The assembly according to claim 1, the electronic module comprising a profiled portion to receive the profiled portion of the clamping wing.

10. The assembly according to claim 1, the electronic module comprising a first and second contact point that contact a corresponding first and second contact point on the vehicle tire rim.

11. The assembly according to claim 10, the electronic module comprising a center of gravity positioned between a line formed between the first and second contact point and the vehicle tire rim.

12. The assembly according to claim 1, the fastening wing being screwably coupled to the valve body.

13. The assembly according to claim 1, the electronic module being attached to a drop base of the vehicle tire rim.

14. The assembly according to claim 1, the electronic module being movable around an axis parallel to a line tangent to the vehicle rim.

15. A method for attaching an electronic module to a vehicle wheel rim, comprising:

coupling a spring element to a drop base of the vehicle wheel rim; and clamping the electronic module between the spring element and the drop base;

positioning a first bottom portion of the electronic module into a first seat position;

positioning a second bottom portion of the electronic module into a second seat position; and positioning a center of gravity of the electronic module between a line formed between the first and second seat position and the drop base.

16. The method according to claim 15, further comprising:

positioning a first bottom portion of the electronic module into a first seat position;

positioning a second bottom portion of the electronic module into a second seat position; and positioning a center of gravity of the electronic module between a line formed between the first and second seat position and the drop base.

17. The method according to claim 15, the coupling of the spring element to the drop base comprising locating a valve body to extend through the drop base; and attaching a first leg of the spring element to the valve body.

18. The method according to claim 17, further comprising:

sealing the attachment of the first leg and the valve body.

19. The method according to claim 18, further comprising:

inserting a spacer device between the first leg and the valve body to protect the sealing attachement.

20. The method according to claim 15, the clamping of the electronic module comprising:

exerting a substantially constant force on a top portion of the electronic module toward the drop base, wherein the substantially constant force is greater than a centrifugal force exerted by rotation of the vehicle wheel rim.

21. The method according to claim 15, the clamping of the electronic module comprising:

exerting a substantially constant first force on a top portion of the electronic module toward the drop base; and exerting a substantially constant second force, greater than the substantially constant first force, on the top portion of the electronic module toward the drop base when a centrifugal force is greater than the substantially constant first force.

22. The method according to claim 15, the clamping of the electronic module comprising:

contacting a top of the electronic module with a leg of the spring element to exert a clamping force.

23. The method according to claim 22, further comprising:

profiling an end of the leg in a direction of the clamping force; and contacting the top of the electronic module with the profiled end of the leg.

24. The method according to claim 22, the clamping of the electronic module further comprising adjusting the clamping force in accordance with a length of the leg of the spring element.

25. A device for detachably fastening an electronic module to a rim of a vehicle wheel having a pneumatic tire, comprising:

a spring element including a free end, the electronic module to be clamped between the free end and the rim; and a seal and a stop ring coupled to the free end of the spring element, wherein the stop ring compensates pressures exerted on the seal.

26. The device according to claim 25, the spring element to be affixed to an end of a valve body oriented toward an inner chamber of the pneumatic tire.

27. The device according to claim 25, a contact face of the free end having a profiled portion, wherein the profiled portion corresponds with a substantially equivalent profiled portion of the electronic module.

28. The device according to claim 25, further comprising a seal and a stop ring, wherein the stop ring compensates pressures exerted on the seal.

29. The device according to claim 25, the free end comprising a longitudinal split forming an outer part and an inner part, the inner part comprising a greater rigidity than the outer part, wherein the outer part produces a prestress force to be exerted on the electronic module to position the electronic module in a drop base and absorbs at least a part of a centrifugal force or a reaction force to be exerted on the electronic module, wherein the inner part is to be coupled with a support face of the electronic module and forms a spring path limiting device of the outer part when the outer part cannot absorb an intense centrifugal force.

30. The device according to claim 25, in combination with the electronic module, the electronic module comprising an approximately triangular cross-section including a top and two legs; and the top comprising a surface arched and the two legs having different lengths, wherein the electronic module further includes a center of gravity located between a connecting line between seating points of the electronic module and the vehicle wheel rim.

31. A method for attaching an electronic module to a vehicle wheel rim, comprising:

coupling a spring element to a drop base of the vehicle wheel rim;

clamping the electronic module between the spring element and the drop base;

the coupling of the spring element to the drop base comprising locating a valve body to extend through the drop base; and attaching a first leg of the spring element to the valve body.

32. The method according to claim 31, further comprising:

sealing the attachment of the first leg and the valve body.

33. The method according to claim 32, further comprising:

inserting a spacer device between the first leg and the valve body to protect the sealing attachment.

34. A method for attaching an electronic module to a vehicle wheel rim, comprising:

coupling a spring element to a drop base of the vehicle wheel rim;

clamping the electronic module between the spring element and the drop base; and the clamping of the electronic module comprising:

exerting a substantially constant first force on a top portion of the electronic module toward the drop base; and exerting a substantially constant second force, greater than the substantially constant first force, on the top portion of the electronic module toward the drop base when a centrifugal force is greater than the substantially constant first force.

35. A method for attaching an electronic module to a vehicle wheel rim, comprising:

coupling a spring element to a drop base of the vehicle wheel rim;

clamping the electronic module between the spring element and the drop base; and the clamping of the electronic module comprising contacting a top of the electronic module with a leg of the spring element to exert a clamping force.

36. The method according to claim 35, further comprising:

profiling an end of the leg in a direction of the clamping force; and contacting the top of the electronic module with the profiled end of the leg.

37. The method according to claim 35, the clamping of the electronic module further comprising adjusting the clamping force in accordance with a length of the leg of the spring element.

38. A device for detachably fastening an electronic module to a rim of a vehicle wheel having a pneumatic tire, comprising:

a spring element including a free end, the electronic module to be clamped between the free end and the rim; and the free end comprising a longitudinal split forming an outer part and an inner part, the inner part comprising a greater rigidity than the outer part, wherein the outer part produces a prestress force to be exerted on the electronic module to position the electronic module in a drop base and absorbs at least a part of a centrifugal force or a reaction force to be exerted on the electronic module, wherein the inner part is to be coupled with a support face of the electronic module and forms a spring path limiting device of the outer part when the outer part cannot absorb an intense centrifugal force.

39. A device in combination with an electronic module for detachably fastening the electronic module to a rim of a vehicle wheel having a pneumatic tire, comprising:

a spring element including a free end, the electronic module to be clamped between the free end and the rim;

the electronic module comprising an approximately triangular cross-section including a top and two legs; and the top comprising a surface arched and the two legs having different lengths, wherein the electronic module further includes a center of gravity located between a connecting line between seating points of the electronic module and the vehicle wheel rim.

* * * * *